US009904961B2

(12) United States Patent  
Al-Shiridah et al.

(10) Patent No.: US 9,904,961 B2  
(45) Date of Patent: Feb. 27, 2018

(54) SYSTEM AND METHOD FOR DETERMINING THE FEEDBACK CAPACITY OF INFORMATION DISTRIBUTED IN A COMPLEX NETWORK

(71) Applicant: KUWAIT UNIVERSITY, Safat (KW)

(72) Inventors: Ghufran Abdullah Al-Shiridah, Jabriyah (KW); Khaled Mahdi, Al-Salam (KW); Maytham Safar, Al-Salam (KW)

(73) Assignee: KUWAIT UNIVERSITY, Safat (KW)

( * ) Notice: Subject to any disclaimer, the term of this patent is extended or adjusted under 35 U.S.C. 154(b) by 428 days.

(21) Appl. No.: 14/706,940

(22) Filed: May 7, 2015

(65) Prior Publication Data

US 2016/0330089 A1    Nov. 10, 2016

(51) Int. Cl.  
  *G06F 15/16*   (2006.01)  
  *G06Q 50/00*   (2012.01)  
  *H04L 12/24*   (2006.01)

(52) U.S. Cl.  
  CPC .......... *G06Q 50/01* (2013.01); *H04L 41/145* (2013.01); *H04L 41/16* (2013.01)

(58) Field of Classification Search  
  CPC ........ G06Q 50/01; H04L 41/145; H04L 41/16  
  See application file for complete search history.

(56) References Cited

U.S. PATENT DOCUMENTS 7,897,361 B2    2/2011  Bhan et al.  
9,282,007 B2 *  3/2016  Effros ................... H04L 41/145  
2002/0147937 A1  10/2002 Wolf  
2005/0132051 A1   6/2005 Hill et al.  
2005/0278437 A1  12/2005 Xie et al.  
2008/0080401 A1* 4/2008  Ribiere ................. H04L 45/025  
                                              370/256

(Continued)

FOREIGN PATENT DOCUMENTS

CN         1703015 A       11/2005

OTHER PUBLICATIONS

Safar, Maytham, Khaled Mandi, and Ghufran Al-Shiridah, "Feedback Capacity of Random Networks," Network-Based Information Systems (NBiS), 2012 15th International Conference on, IEEE, 2012, pp. 231-238.

(Continued)

*Primary Examiner* — Viet D Vu  
(74) *Attorney, Agent, or Firm* — Richard C. Litman

(57) ABSTRACT

The system and method for determining the feedback capacity of information distributed in a complex network determines feedback capacity as information is received and diffused throughout the network. Traditionally, real networks, such as computer networks, were used in determining network feedback. However, current complex networks typically incorporate graphing models for network analysis. The system and method provide a process to determine the quality of a complex network with respect to feedback capacity, such as can be determined by a corresponding Belief Propagation algorithm and a corresponding entropy equation. The system and method can also determine the cyclic entropy per penetration in a complex network, the depth penetration for nodes in the complex network and a plurality of cycle counts per node in the complex network based on a source node.

4 Claims, 15 Drawing Sheets

(56) References Cited

U.S. PATENT DOCUMENTS

2013/0246645 A1     9/2013   Langille
2013/0263197 A1   10/2013   Yuan et al.
2016/0142266 A1*   5/2016   Carroll .................... H04L 41/16
                                                                                           706/12
2016/0308898 A1* 10/2016   Teeple ................ H04L 63/1433

OTHER PUBLICATIONS

Al-Shiridah, Ghufran, Khaled Mandi, and Maytham Safar, "Feedback Capacity of Different Complex Network Models." Advanced Information Networking and Applications Workshops (WAINA), 2013 27th International Conference on, IEEE, 2013, Mar. 25-28, 2013, 8 pages.

"Belief propagation", Wikipedia, http://en.wikipedia.org/wiki/Belief_propagation, retrieved Jul. 31, 2014, 9 pages.

"Boltzmann's entropy formula", Wikipedia, http://en.wikipedia.org/wiki/Boltzmann's_entropy_formula, retrieved Jul. 31, 2014, 4 pages.

* cited by examiner

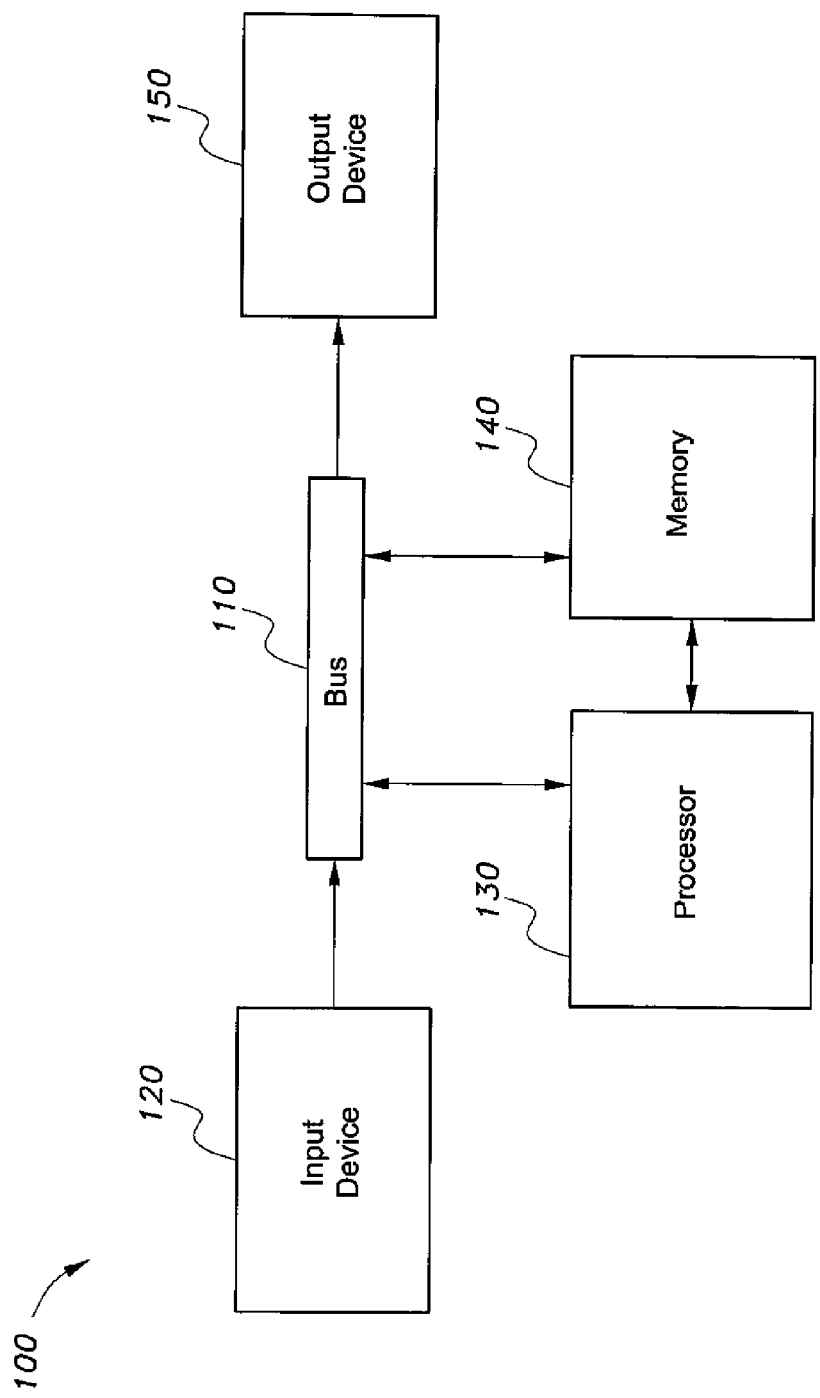

SYSTEM AND METHOD FOR DETERMINING THE FEEDBACK CAPACITY OF INFORMATION DISTRIBUTED IN A COMPLEX NETWORK

BACKGROUND OF THE INVENTION

1. Field of the Invention

The present invention relates generally to complex network analysis, and particularly to a system and method for determining the feedback capacity of information distributed in a complex network as the information is received and diffused throughout the network.

2. Description of the Related Art

In the context of network theory, a complex network can be a graph (network) with non-trivial topological features, i.e., features that do not occur in simple networks, such as chains, grids, lattices, and fully-connected graphs often occur in real life situations. The study of complex networks is a young and active area of scientific research inspired largely by the empirical study of other real-world networks, such as computer networks and social networks. Examples of complex networks can include information networks, social networks, technological networks, or biological networks.

In social networks, the entities can be, for example, individuals, groups, or organizations. Examples of relationships among the entities in social networks can include communications, such as e-mail, telephone, or physical meetings. An example of a biological network is a metabolic network in which the entities are metabolic substrates, and the relationships are chemical reactions between the substrates. Examples of technological networks can include an electrical power grid (e.g., nodes are power plants, and edges are power lines), and a computer network as can include a local area network (LAN), a wide area network (WAN), cellular network, radio network, broadcasting network, intranet, extranet, the Internet (e.g., nodes are routers or machines, and edges are network connections), cloud network, etc. A complex network model can be used to identify a level of information that has been dispersed throughout a network as an indicator at which the information feedback is no longer significant in the network, i.e., the network feedback capacity.

The rapid and global emergence of complex networks over the past few years and their adoption by a large number of users, such as over the Internet, make complex networks now one of society's most powerful methods of rapidly spreading news and key information to large populations. Therefore, it is desirable to understand and analyze these complex networks in which data is transferred through associations and data flows in cycles in a manner that can ensure the information distributed is accurate, as well as to determine the information's value as it is distributed in the network.

Thus, a method and system for determining the feedback capacity of information distributed in a complex network addressing the aforementioned problems is desired.

SUMMARY OF THE INVENTION

The system and method for determining the feedback capacity of information distributed in a complex network includes a program, applet, or tool, such as a Java® tool (Java is a registered trademark of Sun Microsystems, Inc. of Santa Clara, Calif.) or a scripting tool as is known in the art that can generate various types of a complex network. The various types of a complex network can include a random, scale-free, or small world complex network, for example. Once the program or tool, such as the Java tool or the scripting tool, has generated the complex network (e.g. random, scale-free, or small world complex network), the tool determines the penetrations and depths of the network by selecting a node as a starting point. The tool then obtains a cycle count for each node penetration (based on a corresponding Belief Propagation algorithm) to determine the cyclic entropy for each node penetration (based on an entropy equation for the complex network).

Once the cyclic entropy per penetration is determined for the complex network, the system and method determines the feedback capacity of the complex network. After the feedback capacity of the complex network (e.g., random, scale-free, or small-world complex network) is determined, the tool can produce various forms of output related to the feedback capacity of the complex network that can be based on a user's request, for example, for a designated form of output. The various forms of output for the feedback capacity can include text files containing the values of the cyclic entropy per penetration, and the plotting of these cyclic values can indicate a level at which information is no longer significant in the complex network, i.e., the network feedback capacity.

The scripting tool can also output the cycle counts per node in a text format based on a corresponding Belief Propagation algorithm. The scripting tool can also output the cyclic entropy for each penetration based on an entropy equation for the complex network. Depictions of the cyclic entropy values, cyclic counts per node, and entropy per node can be depicted on a chart or graph, but other forms of illustrations can be used for the output that can depend on the use or application.

These and other features of the present invention will become readily apparent upon further review of the following specification and drawings.

BRIEF DESCRIPTION OF THE DRAWINGS

FIG. 1 illustrates a block diagram of an embodiment of an exemplary system for determining the feedback capacity of information distributed in a complex network according to the present invention.

Figure 8:
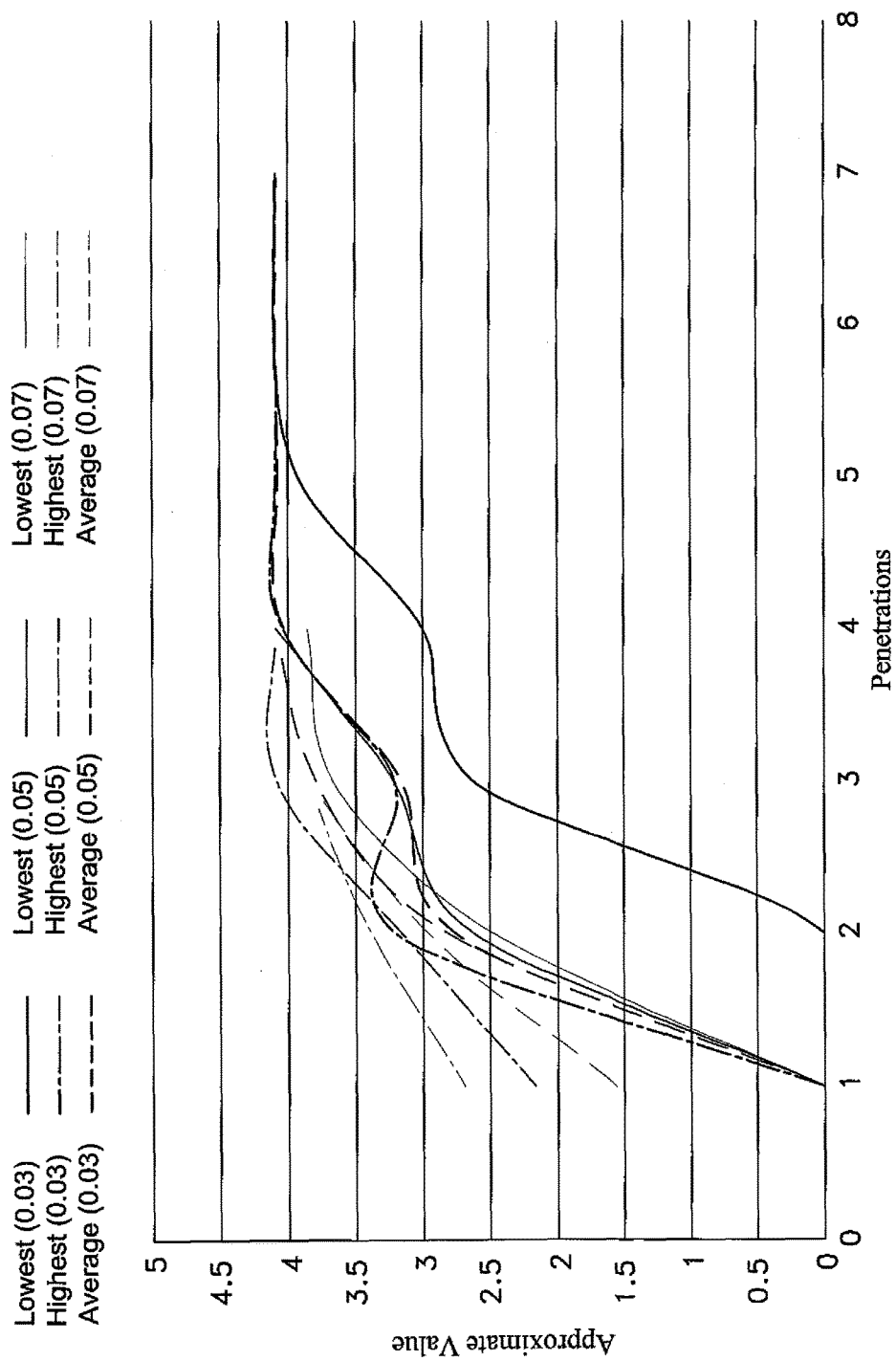

FIG. 8 is a graph showing cyclic entropy as a function of number of penetrations for a random network having 150 nodes and differing penetration depth scales.

Figure 9:
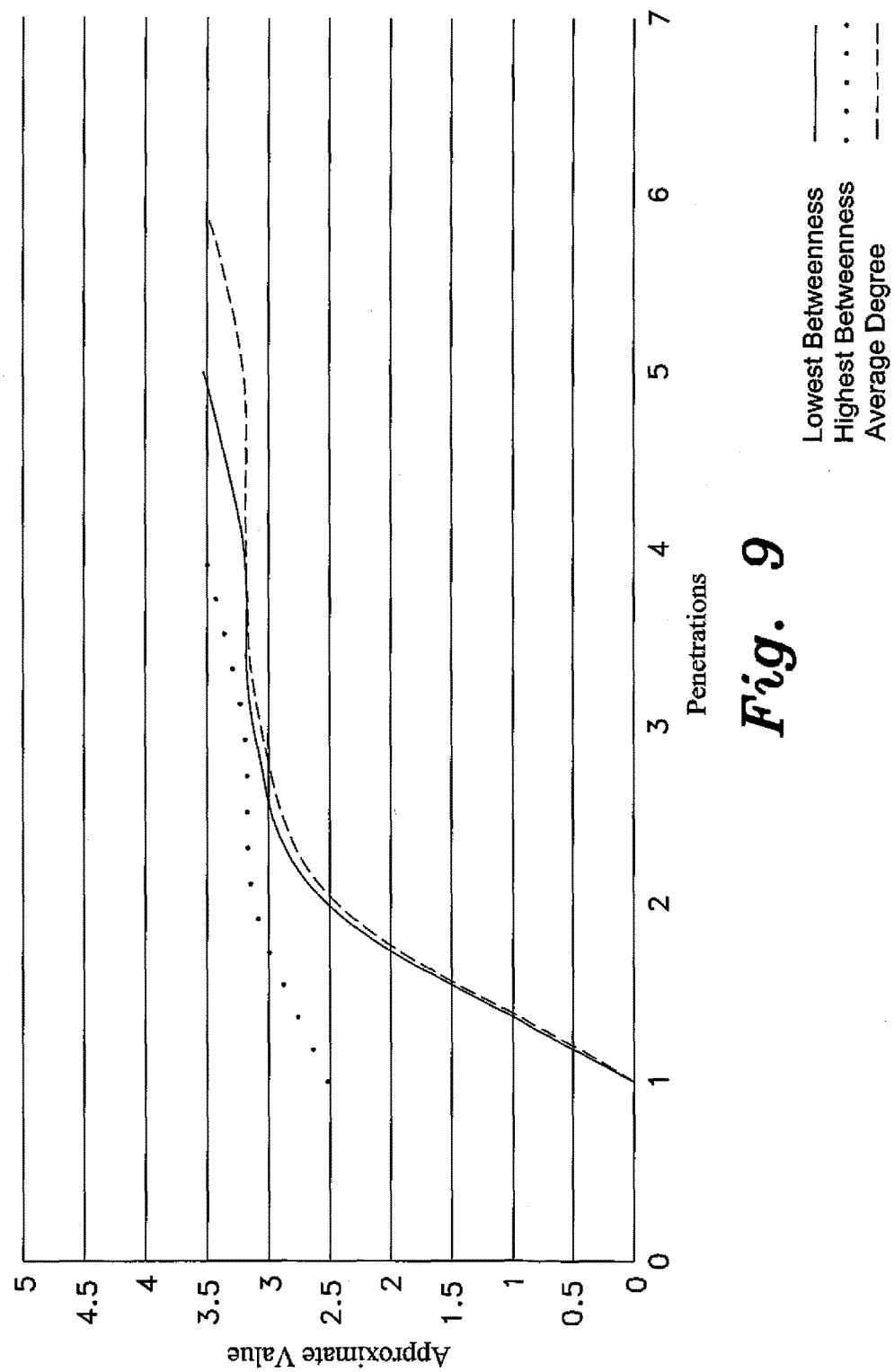

FIG. 9 is a graph showing cyclic entropy as a function of number of penetrations for a scale-free network having 150 nodes, M=5 and $M_0$=5, and with different configurations for different starting points.

Figure 10:
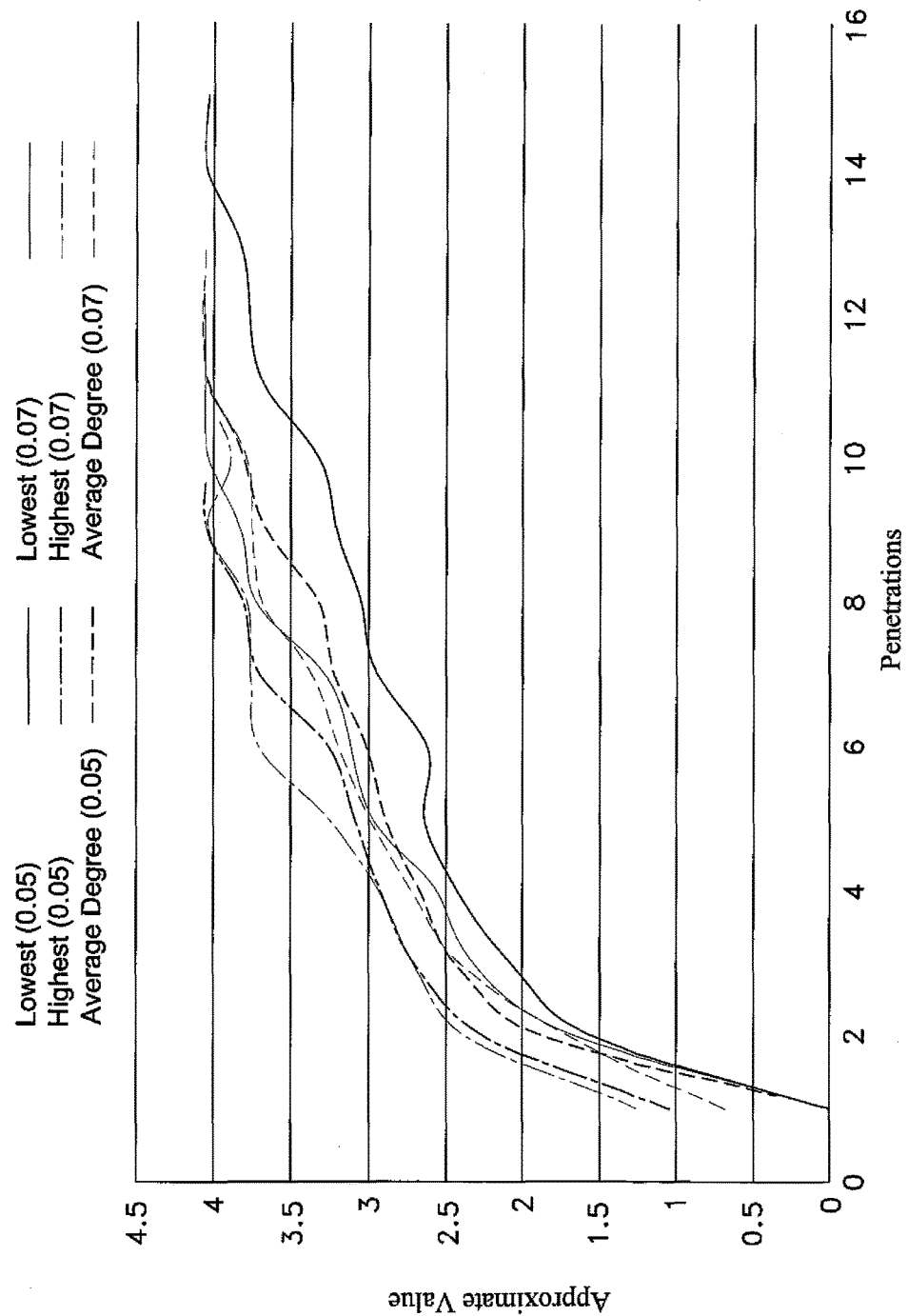

FIG. 10 is a graph showing cyclic entropy as a function of number of penetrations for a Small World network having 150 nodes, feedback loop size of 4, and differing penetration depth scales.

Figure 11:
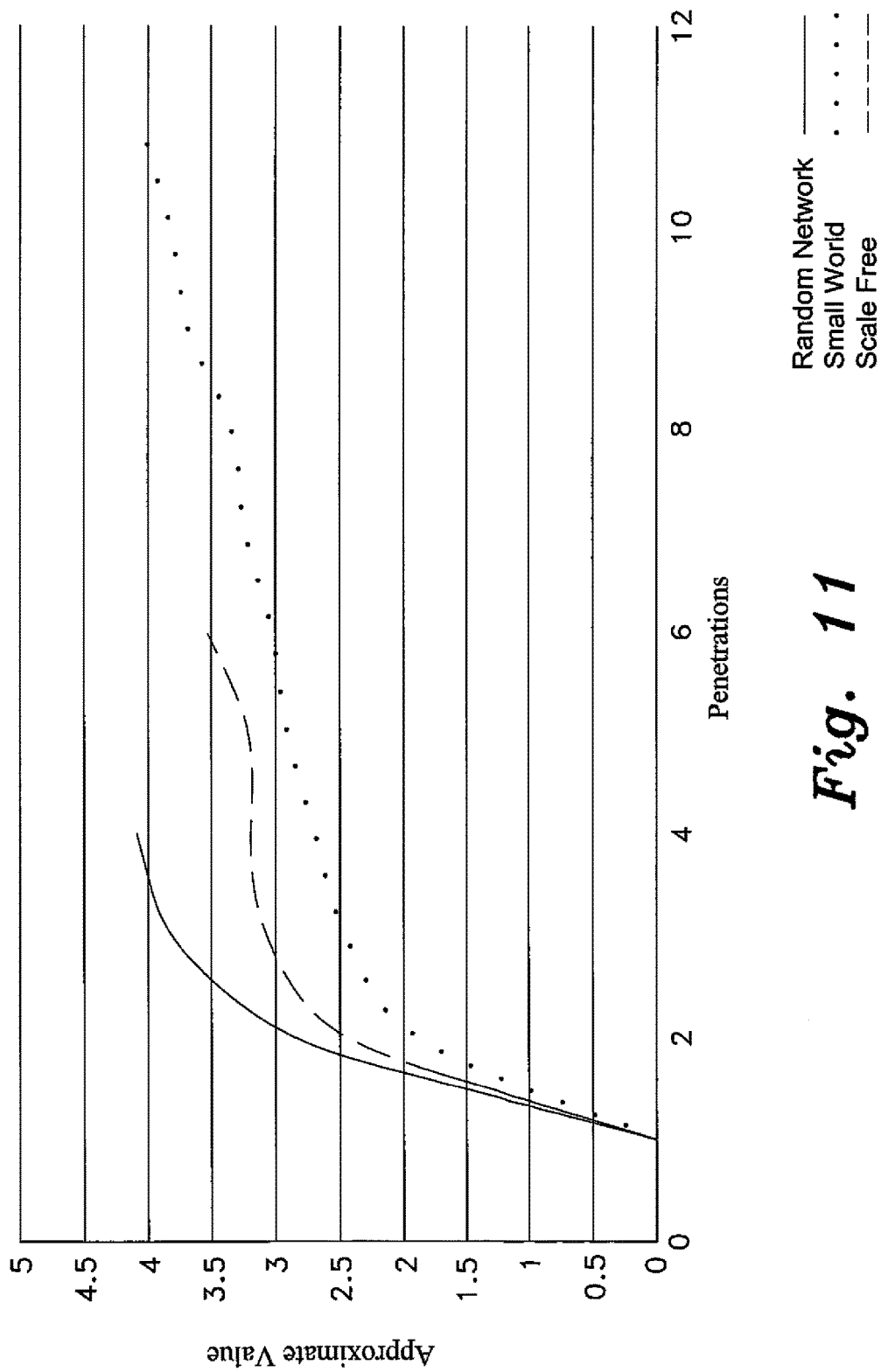

FIG. 11 is a graph showing cyclic entropy as a function of number of penetrations for different network configurations having 150 nodes and a randomly selected node with the average degree as the starting point.

Figure 12:
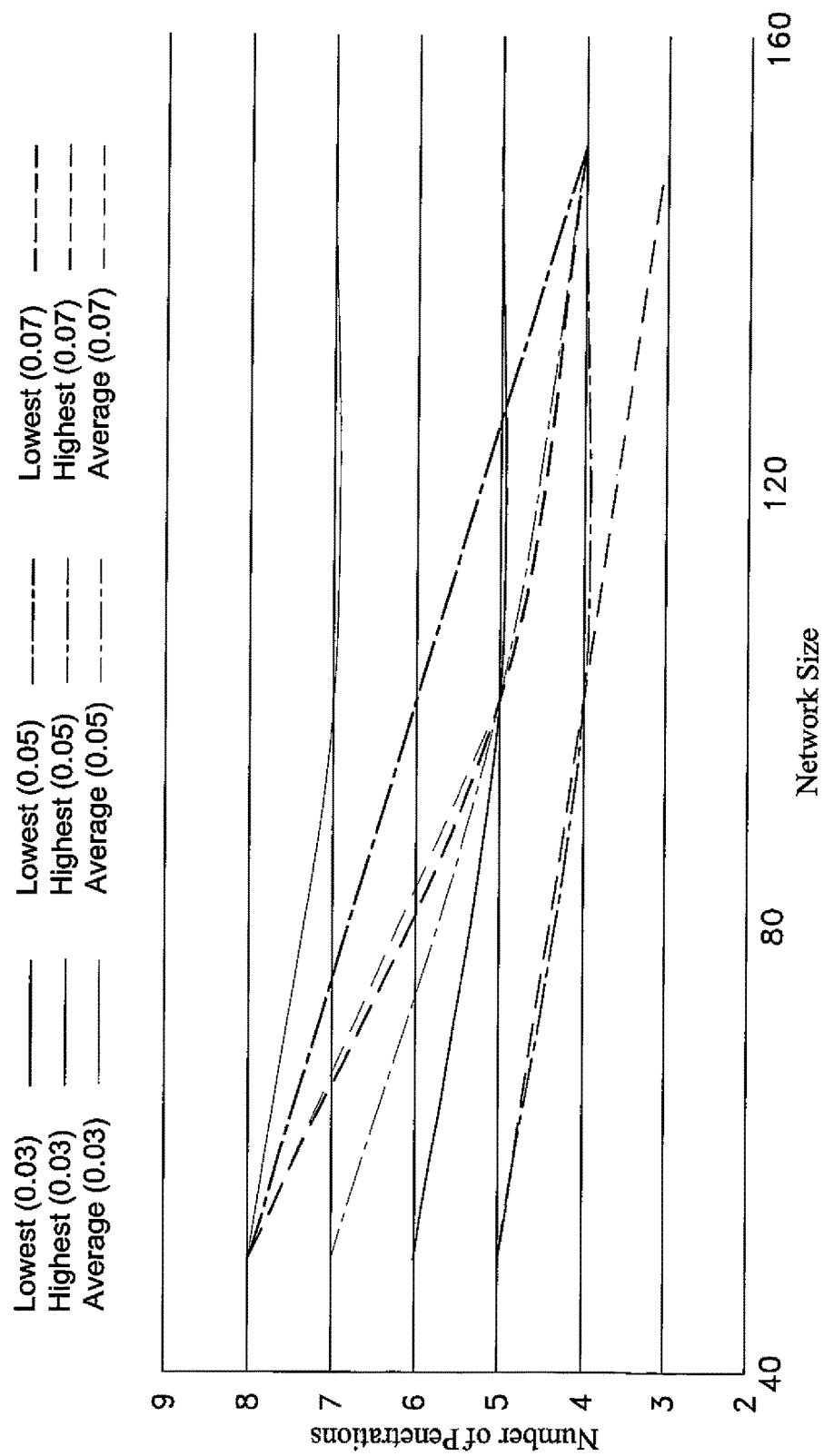

FIG. 12 is a graph comparing number of penetrations as a function of network size for different connecting probabilities and different starting points.

Figure 13:
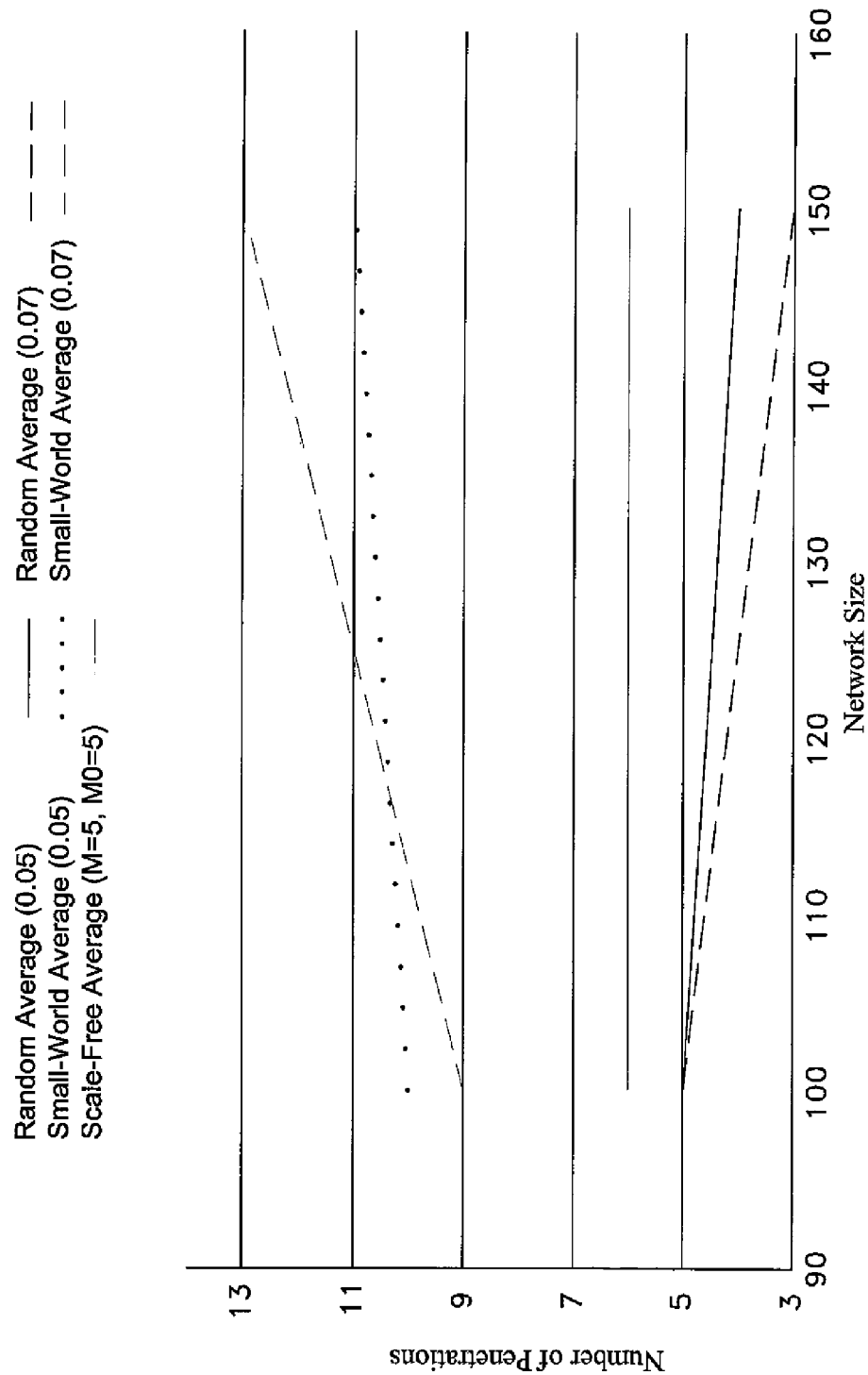

FIG. 13 is a graph comparing number of penetrations as a function of network size for a random network, a Small World network, and a scale-free network for a randomly selected node with the average degree as the starting point.

Unless otherwise indicated, similar reference characters denote corresponding features consistently throughout the attached drawings.

DETAILED DESCRIPTION OF THE PREFERRED EMBODIMENTS

With reference now to the drawings, in particular to FIGS. 1-5, embodiments of systems and methods for determining feedback capacity of information distribution, such as in a complex network are described. FIGS. 1-5 embody and illustrate various features and concepts of embodiments of systems and methods for tools that can produce the feedback capacity of a network, the entropy per node or number of cycles per node.

FIG. 1 includes a computer-implemented device, such as a general purpose computing device 100, such as can constitute a feedback capacity information distribution system, that includes a system bus 110 that couples various system components, such as an input device 120, a processor 130, a memory 140, and an output device 150. The system can also include the memory 140 communicatively connected to the processor 120. The processor 120 can be associated with, or incorporated into, any suitable type of computing device, for example, a personal computer or a programmable logic controller (PLC) or an application specific integrated circuit (ASIC).

The computing device 100 can include, for example, additional processors, various types of memory, storage, and devices (e.g., monitor, keyboard, disk drive, Internet connection, etc.). Further, the computing device 100 can include circuitry, units, hardware and/or software for carrying out features of the processes and methods for determining feedback capacity of information distribution. The information or data associated with the computing device 100 can be accessed and stored in data storage, a database or removable computer readable media. In some operational settings, the computing device 100 can be configured as a system that includes one or more units, each of which can be configured to carry out one or more features of the processes and methods for determining feedback capacity of information distribution, such as in software, hardware, and/or a combination thereof.

It should be noted that the system as exemplified by the computing device 100 can be operated with more than one processor. The computing device 100 can also be a group or cluster of computing devices communicatively connected, such as through a network, to provide greater processing capability. The processor 130 can include any general purpose processor and a hardware or software module configured to control the processor. It can also include a special purpose processor where software instructions are incorporated in the processor design. The processor 130 can be a self-contained computing system, containing a number of cores or processors, a bus, a memory, a controller, etc.

The system bus 110 can be any of various types of bus structures, such as a memory bus or memory control, a peripheral bus, and a local bus using a number of bus architectures. The system bus 110 can be adapted to transmit information or data through hard wire, wirelessly, or another form of connection to the computing device or system, such as the computing device 100, for example. The input device 120 and the output device 150 can include, or can be connected to, displays, printers, touchscreens, touch panels, touch pads, virtual or regular keyboards, virtual or regular mice, etc. Further, the computing device 100 can include circuitry, units, hardware and/or software for carrying out features of the processes and methods for determining feedback capacity of information distribution in a complex network.

The computing device 100 can include server computers (e.g., cloud server computers, etc.), desktop computers, cluster-based computers, and the like. The computing device 100 can also include smaller computers, such as mobile computing devices, such as cellular phones including smartphones, handheld computing devices, personal digital assistants (PDAs), etc., tablet computers, laptop computers, and should not be construed in a limiting sense. Moreover, it is noted that the computing device 100 can be configured to include additional systems in order to implement various functionalities, such as can be related to determining feedback capacity of information distribution in a complex network.

Figure 2A:
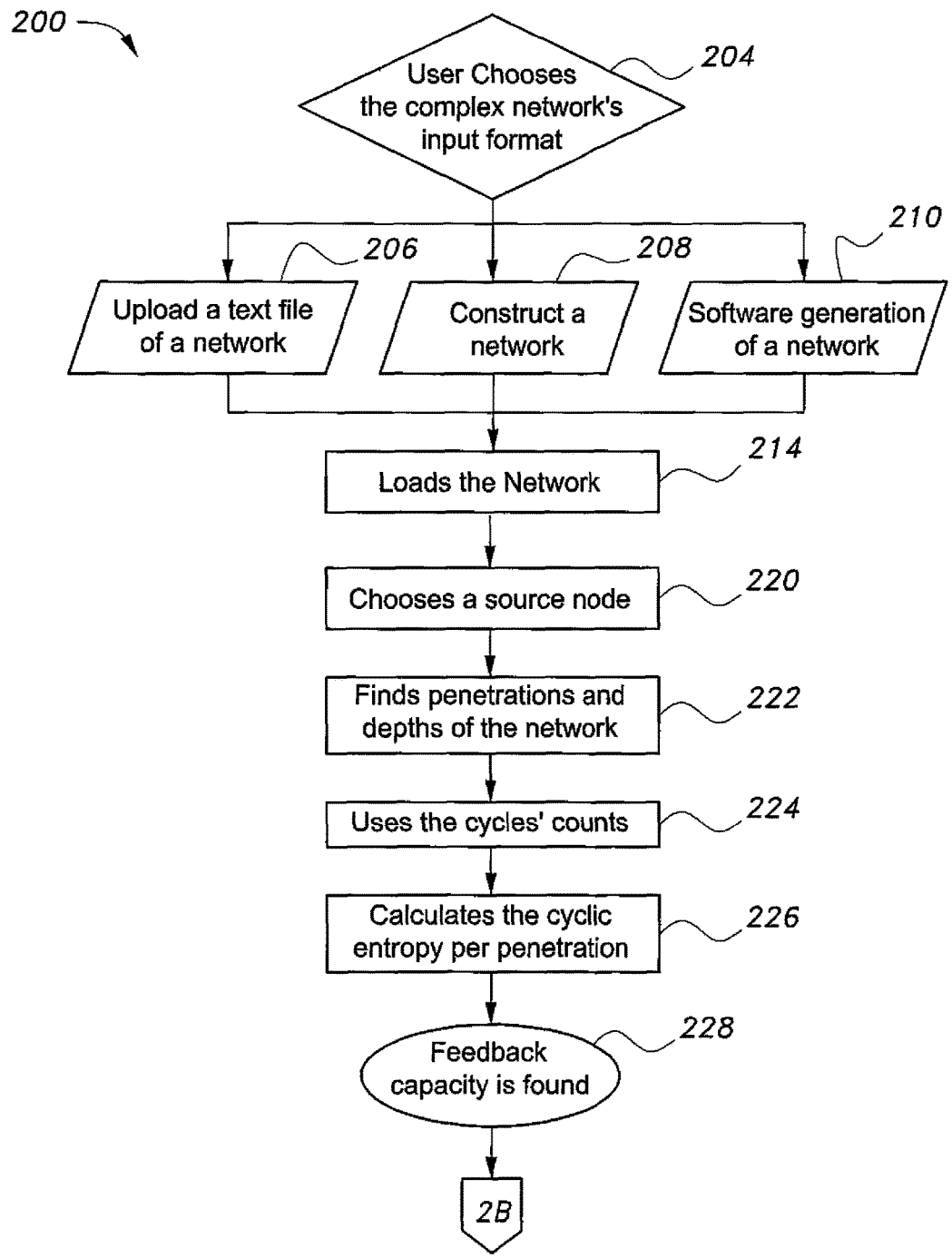
FIG. 2A and FIG. 2B is a flowchart illustrating methods and processes in a system for determining the feedback capacity of information distribution in a complex network according to the present invention.
Figure 2B:
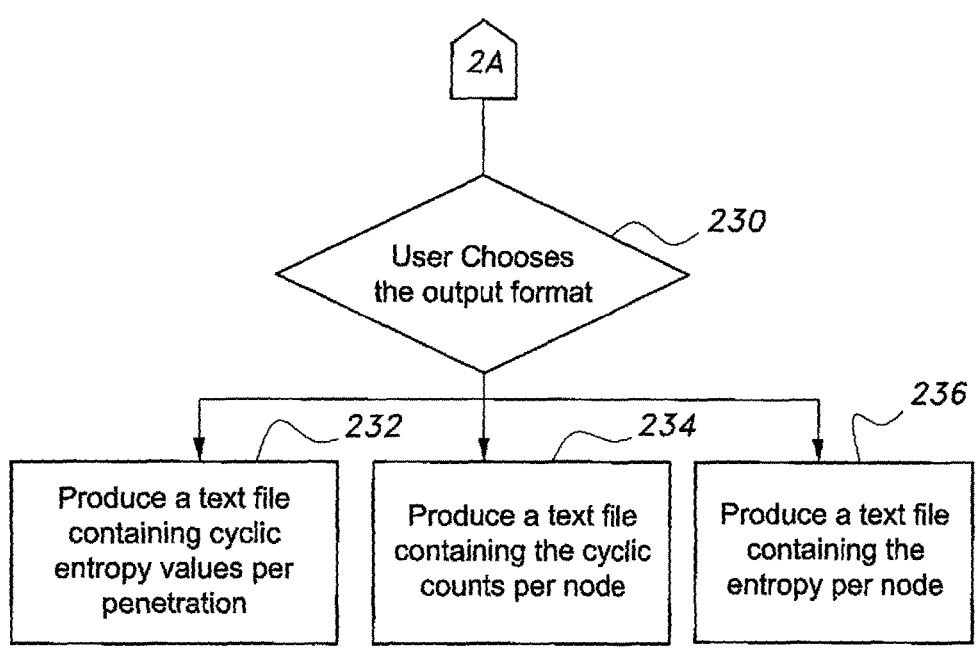

FIG. 2A and FIG. 2B illustrate a flowchart 200 of methods for determining the feedback capacity of information distributed in a complex network. In nonhierarchical complex networks, an internal feedback structure exists in the form of cycles. Diffusion of information from one node to reach out to all the rest of the nodes occurs through penetration layers (depths). The information credibility or accuracy can be challenged in each layer due to internal feedback loops.

In embodiments of systems and methods for determining feedback capacity of information distribution in complex networks, the feedback diffusion capacity and existing patterns of relationships and ties among complex networks entities are analyzed to find how the feedback of information is diffused and propagated through the complex network. As the information propagates to subsequent layers, on average, the feedback density heterogeneity in complex networks reaches saturation after a penetration number, e.g. third penetration, in random and scale-free networks. The maximum penetration defines the feedback capacity of the network. In the small-world networks, the feedback capacity is dynamic and continues increasing as the network size increases. Small world networks have been regarded as having a relatively best feedback capacity among network configurations of complex networks.

The methods in the flowchart 200 in FIGS. 2A and 2B are designed to input or accept a number of options to provide input to a complex network and produce an analysis of the complex network. At step 204, a program, applet, or a tool, such as a Java or scripting tool known in the art, can select a type of complex network, such as through an input device or program. The input device can be through a virtual interface, a program, or a scripting tool, or can be or include an input device, such as the input device 120 of FIG. 1. The information submitted can also be submitted through hardware components (e.g. wire, optical fiber, etc., such as the bus 110) and electronic pathways or software, including communication protocols. The various types of complex networks can include a random, scale-free, or small world complex network, for example. The input device can include touchscreens, touch panels, touch pads, virtual or regular keyboards, virtual or regular mice, but should not be construed in a limiting sense, and can also include data storage, disk drives, or other media that can contain or store data, for example.

Figure 3A:
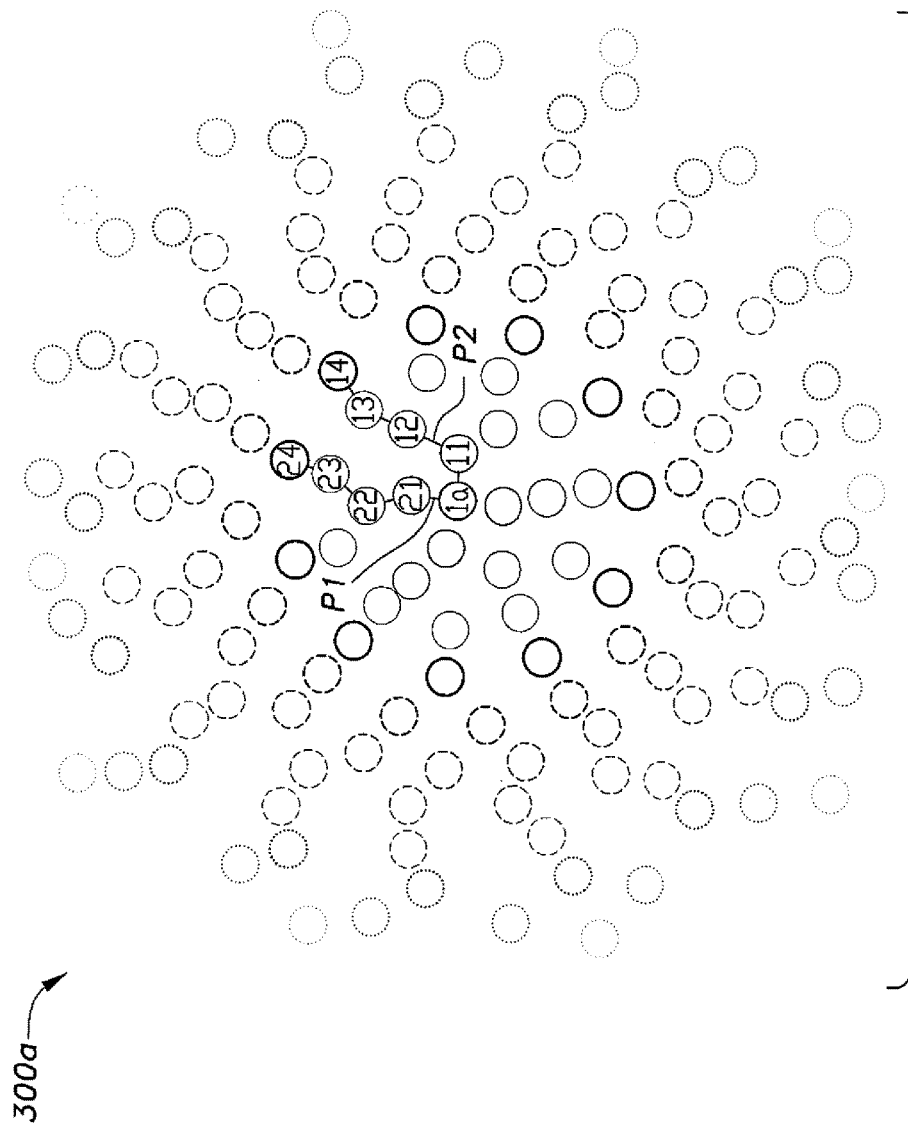
FIG. 3A illustrates an example of a schematic diagram of a small-world complex network to which the present invention can be applied.
Figure 3B:
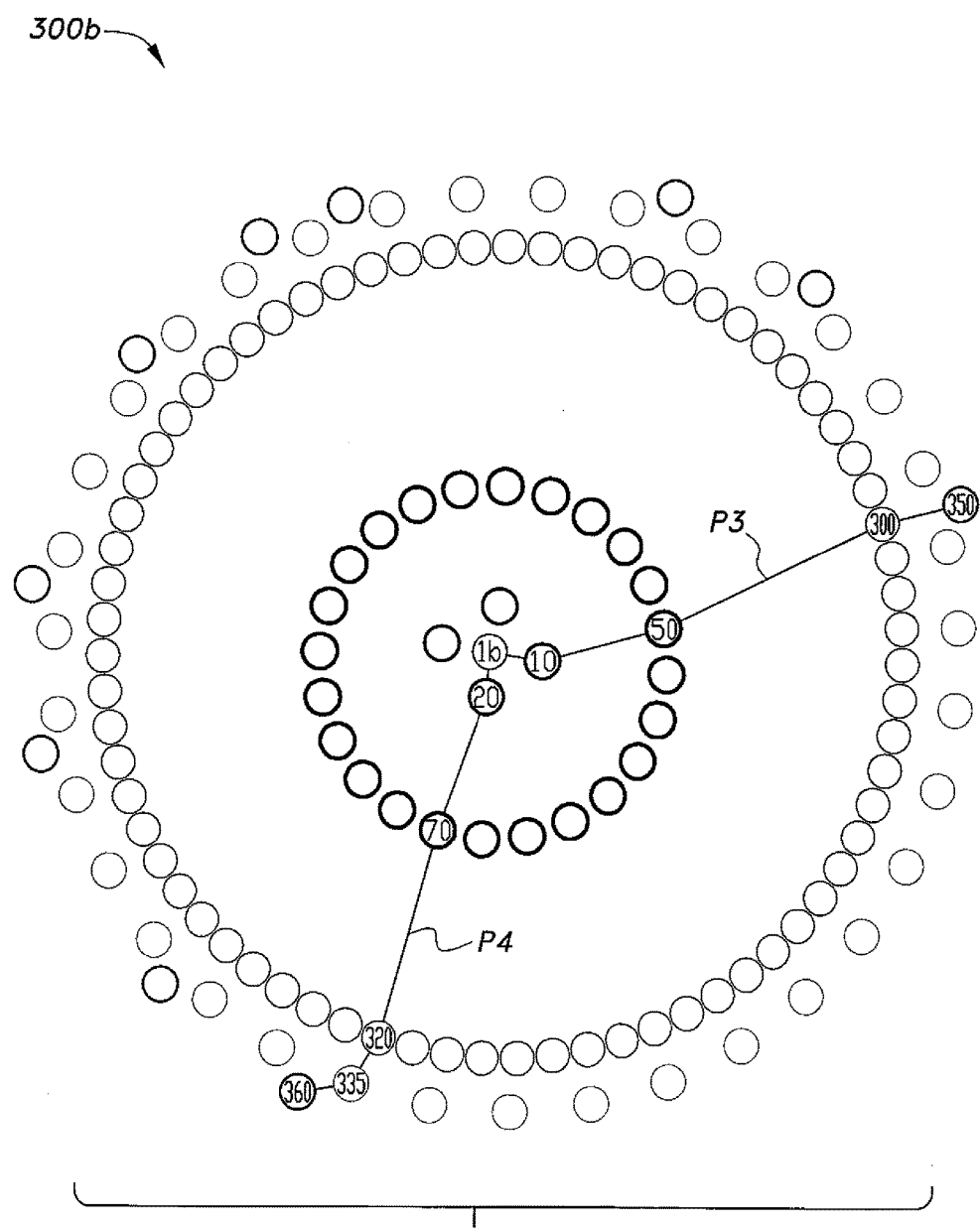
FIG. 3B illustrates an example of a schematic diagram of a scale-free complex network of different sizes to which the present invention can be applied.

Once the tool, such as the Java or scripting tool, has generated or selected a complex network, such as a small-world complex network 300a illustrated by FIG. 3A or a scale-free complex network 300b of FIG. 3B, for example, through steps 206, 208 or 210, the network is loaded at step 214, such as loading by a software program. The tool can be a Java virtual machine interface tool, a program interface, or hardware designed to complete a series of instructions, such as the processor 130 of FIG. 1. Continuing at step 220, the tool, such as the NAViGaTOR2.2 tool, computes the penetrations and depths of the complex network by selecting a source node as starting point. For example, the small-world complex network 300a of FIG. 3A illustrates a schematic diagram of a cluster of a plurality of nodes, such as including nodes 1a, 11-14, 21-24, where node 1a is selected as the main, starting or source node for determining the feedback capacity in the small-world complex network 300a.

Similarly, the scale-free complex network 300b depicts a schematic diagram of a plurality of nodes, including 1b, 10, 20, 50, 70, 300, 320, 335, 350, and 360, where node 1b is selected as the main, starting or source node for determining the feedback capacity in the scale-free complex network 300b. A node can be a data node that represents a data store, such as in a graph, chart, table or index. The source node can act as a main node and can be used to record the number of times information has left the main node, traveled back to the main node, been directed to another node, and so on. The tool, such as the NAViGaTOR2.2 tool, can determine the penetrations and depth of the network at step 222 using a source node as the basis, such as source nodes 1a or 1b.

For example, the small-world complex 300a includes a plurality of available paths between the various nodes, such as depicted by paths P1 and P2. The path P1 includes the source node 1a and nodes 21-24 to show an example of distribution of information among the nodes and the depth penetration of the small-world complex network 300a. Similarly, the path P2 includes the source node 1a and nodes 11-14 to show another example of distribution of information among the nodes and the depth penetration of the small-world complex network 300a.

Also, for example, the scale-free complex 300b includes a plurality of available paths between the various nodes, such as depicted by paths P3 and P4. The path P3 includes the source node 1b and nodes 10, 50, 300 and 350 to show an example of distribution of information among the nodes and the depth penetration of the scale-free complex network 300b. Similarly, the path P4 includes the source node 1b and nodes 20, 70, 320, 335 and 360 to show another example of distribution of information among the nodes and the depth penetration of the scale-free complex network 300b. It should be noted that different levels of penetration between paths P3 and P4 are illustrated in the scale-free complex network 300b, for example.

The scripting tool, such as the NAViGaTOR2.2 tool, can also determine the cycle counts per node penetration at step 224 based on a corresponding Belief Propagation (BP) algorithm, such as or similar to the following:

$$p(x) = \sum_{u \in U} f_u(x_u), \quad (1)$$

where $x_u$ is a vector of neighboring nodes to the factor node u, such as the source node, and p(x) is a probability function corresponding to a distribution of information to a plurality of nodes in the complex network.

Continuing with reference to step 226, the scripting tool, such as the NAViGaTOR2.2 tool, can also determine or calculate cyclic entropy per penetration, as well as can determine the entropy for each node in a complex network, such as complex networks 300a or 300b, based on an entropy equation for the complex network, such as or similar to the following:

$$S = -\sum_i p_i \ln p_i \quad (2)$$

where S is the cyclic entropy for a given penetration, or S can relate to an entropy for a node of a complex network, and $p_i$ is the probability of the links or paths distribution of information for the penetrations of a plurality of nodes in the complex network.

It should be understood that while the examples of desired equations are provided for the Belief Propagation algorithm and the Entropy equation, such as in relations (1) and (2) above, other suitable equations and algorithms and variations thereof can be used in the feedback capacity determination, as can depend on the use or application, and it is not limited in this regard. The feedback capacity of the complex network (e.g. random, scale-free, or small-world complex network) is determined at step 228 and can be determined based on the corresponding equations, such as being based on equations or relations similar to the Belief Propagation algorithm in relation (1) and/or the Entropy equation in relation (2) above. For example, a more complex Belief Propagation algorithm based on statistical mechanics may be used. The algorithm may use the Belief Propagation equations and an approximation method to approximate the statistical mechanics model and find the cycles distribution.

Two methods can be used as approximation algorithms, namely the Monte Carlo simulation and the Bethe approximation. The Bethe approximation is used here because of the well-known correspondence between the Bettie approximation and Belief Propagation. The graphs associated with this algorithm are represented as adjacency matrices. The input to the algorithm is an undirected graph, and the output is the cycle's distribution of the graph (i.e., the number of cycles as a function of their size). The Belief Propagation algorithm begins by reducing the graph. All leaf nodes (i.e., nodes with degree 1 or 0) are removed from the graph. Each edge of the graph is initialized with a random positive value $y^{(0)}$. Each edge is iterated from its initial value until convergence, reaching a fixed value, y*. Convergence is determined according to a desired accuracy level. To guarantee the convergence of the algorithm, $Y^{(T+1)}-y^T$ is restricted to be less than or equal to 0.001, where T is the iteration variable. The value y represents the probability that the edge is present in a cycle c. The y value can be calculated as:

$$y_{i \to j}^{(T+1)} = \frac{u \sum_{m \in \beta_{i-j}} y_{m \to i}^{(T)}}{1 + 0.5u^2 \sum_{m,n \in \beta_{i-j}} y_{m \to i}^{(T)} y_{n \to i}^{(T)}} \quad (3)$$

where u is a positive real number value. From the entire set of y-values, the number of cycles $C_L$ of length L can then be calculated as:

$$L = \sum_{(ij) \in E} \frac{u y_{i \to j}^* y_{j \to i}^*}{1 + u y_{i \to j}^* y_{j \to i}^*}, \text{ and} \quad (4)$$

$$C_L = e^{RN}, \quad (5)$$
where $$R = \frac{1}{N} \sum_{i \in V} \ln\left(1 + 0.5u^2 \sum_{m,n \in \beta_i; m \neq n} (y_{m \to i}^* y_{n \to i}^*)\right) - \quad (6)$$
$$\frac{1}{N} \sum_{(ij) \in E} \ln(1 + u y_{i \to j}^* y_{j \to i}^*) - \frac{L}{N} \ln u,$$

where $\beta_i$ is the set of neighbors of node i, $\beta_{i-j}$ is the set of neighbors of node i except for node j, and N is the number of nodes on the graph.

The procedure is repeated starting from an initial value of $u=u_0$ to $u=u_{max}$, where $u_0$ and $u_{max}$ are each greater than 0. At each iteration step, a new distribution point (L, $C_L$) is produced. The iteration step for u is 0.0001 at the early stages of the algorithm, although this value is not fixed. The value will change when $L_{new}-L_{old}<0.001$ (i.e., when the progress in L is slow). If this condition is satisfied, then u will be increased by 10%. As shown above, the output at each step (L, $C_L$) depends on u. At specific stages of the iteration (when u gets large), too many iterations are wasted outputting nearly the same point. In order to avoid this condition, a jump in u is made. This algorithm yields a plot of (L, $C_L$) points. To extract the needed distribution points (3 to n), interpolation is used. Interpolation equations need at least two points to find the third one. Thus, this point should be surrounded with the other two nodes. For example, given points P1 (5.9876, 453) and P2 (6.0124, 490) and a need to find the number of cycles for L=6, then interpolation leads to a value of 471.5.

There are, however, two problems with the above BP algorithm approach. First, most of the process time is wasted to find the u that gives L inside the region (0 to 1). If it is not in the region, the process will diverge and there will be a need to re-compute $y^{(T+1)}$ again until it finds a proper L. The second problem is the almost unpredictable length L that is given by u. The process wastes too much time trying to find the u that results in an L spaced apart enough from the previous one. Improving and enhancing the BP algorithm for cycles computation in the general random network model suggests two improvements to the use of the BP algorithm. The first improvement is trying to build a mathematical relation between the parameter u of the BP algorithm and the random y network properties. To do that, first, it is necessary to generate a set of random networks, count the cycles using the traditional BP algorithm, and then use these results to find a mathematical model by fitting an equation over the result.

The second improvement is to use the universal cycle's model to improve the distribution estimation. This is motivated by the inability of degree-based parameters to decisively identify the real social network type and the absence of a way to recognize the crossover from one network type to another. For example, a random network has a Poisson distribution of the vertices degree. A "Small-World" network has a generalized binomial distribution. A "Scale-Free" network has a power law distribution form. There is no universality class yet discovered. However, one distribution form that characterizes random networks using cycles existing within the network has been developed. It has been found that in any network, the cycle's distribution takes the shape of a bell; i.e., it has Gaussian distribution. This distribution helps to improve the BP algorithm because instead of finding large numbers of points and trying to estimate the cycle's counts for the integer lengths by interpolation, one can count only a reasonable set of points and use the equation by fitting it over the points. This solves two problems: the need of a large number of points, and the importance of finding a point at the beginning of the curve.

With regard to the entropy of equation (2), in order to mathematically quantify the concept of "information", one must describe the precise state of a system that can be in states 1, 2, ... n with probabilities $p_i$, $P_2$, ... pn, and this requires a well-defined minimum number of bits. In fact, the best thing to be done is to assign $\log_2(1/p_i)$ bits to the occurrence of state i. When applied to a system that can be in W states, each with equal probability p=1/W, it follows that the minimum number of bits is $\log_2 W$. This means that the entropy S is equal to the number of bits required to specify the system. Specifically, entropy is a logarithmic measure of the density of states, i.e., $S = \Sigma_i p_i \ln p_i$.

If one assumes k to be a set of discrete random variables that takes the values k={1, ..., k, ..., N} with probabilities p={P(1), ..., P(i), ..., P(N)} respectively, such that P(k)≥0 and $\Sigma_{k=1}^N P(k)=1$, then there exists a measure of randomness, heterogeneity and uncertainties-known entropy, H, which is given by $H(P) = \Sigma_{k=1}^N p(k) \ln(p(k))$.

In a complex network context, P(k) may represent the degree distribution of links or the remaining degree (outward links) or cycles of size k in the network. Degree distributions of links are the most common representation of P(k). Different models of networks, such as random, Small World, Scale-Free, exponential, uniform, etc. are usually represented and constructed as degree distribution models of actual networks, such as software networks, social networks, biological networks, circuit networks, etc. Simple degree distribution describes the connectedness of the network. Thus, the entropy will be a measure of heterogeneity and uncertainty of network connectedness.

Figure 4:
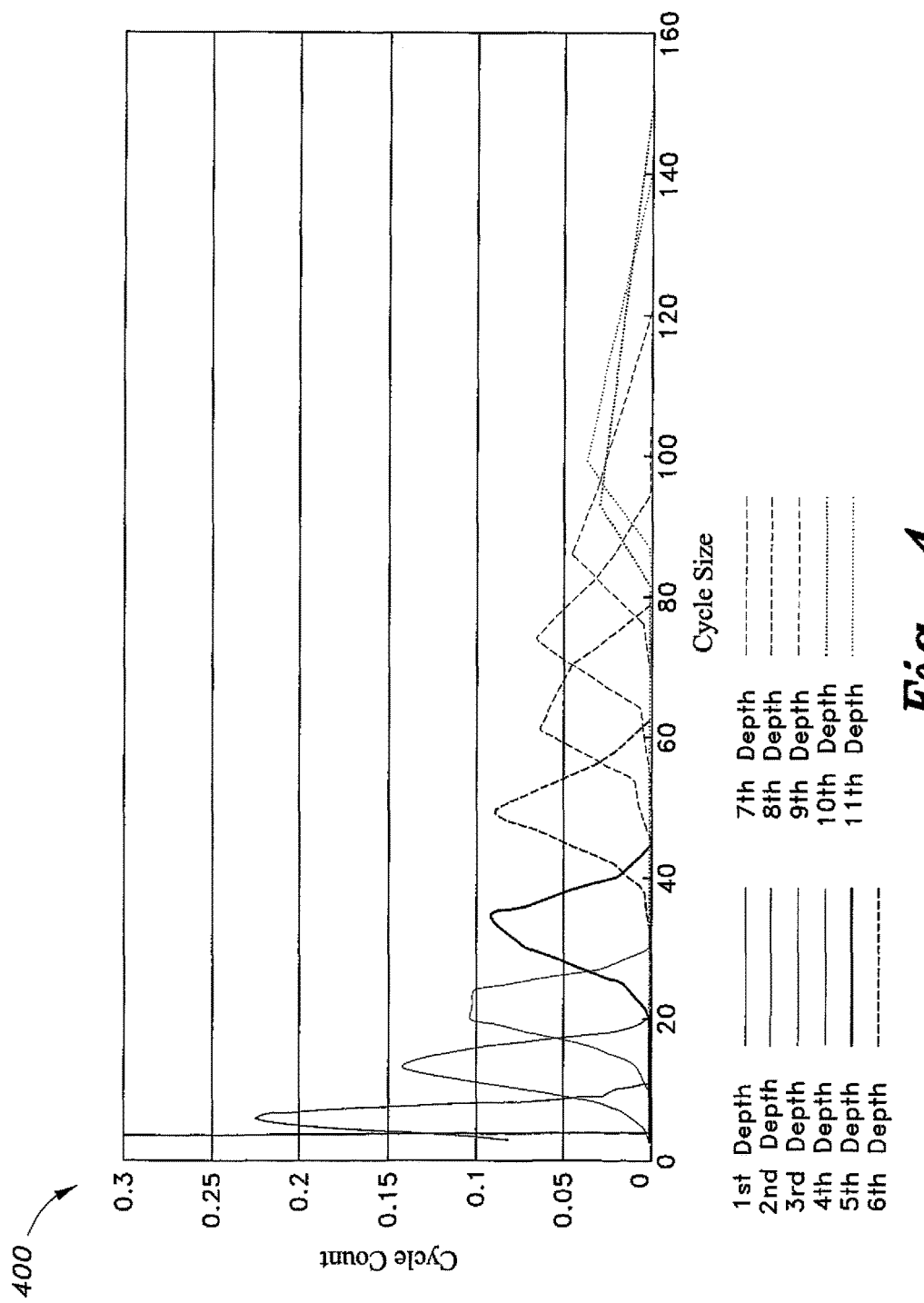
FIG. 4 illustrates an example of a normalized cycle distribution at different depth penetrations in relation to the cycle count and cycle size for the small-world complex network of FIG. 3A.

The tool, such as the NAViGaTOR2.2 tool, can provide a user with options to produce different forms of output related to the feedback capacity of the complex network. At step 230, the user or the tool can choose the form of output related to the feedback capacity. At step 232, the tool can produce a text file containing the cyclic entropy values per penetration. The tool can also produce a text file, such as can be produced in the form of a graph or chart, containing the cycle counts per node at step 234, such as chart 400 of FIG. 4, which depicts the normalized cycle distribution at different depth penetrations in relation to the cycle count and cycle size for the small-world complex network 300a of FIG. 3A. In FIG. 4, a normalized cycle distribution for a Small World network of size N=150 nodes, k=4 and p=0.05 at different penetration depths is shown, starting from a randomly selected node with an average degree, where k is feedback loop size and p is penetration depth scale.

Figure 5:
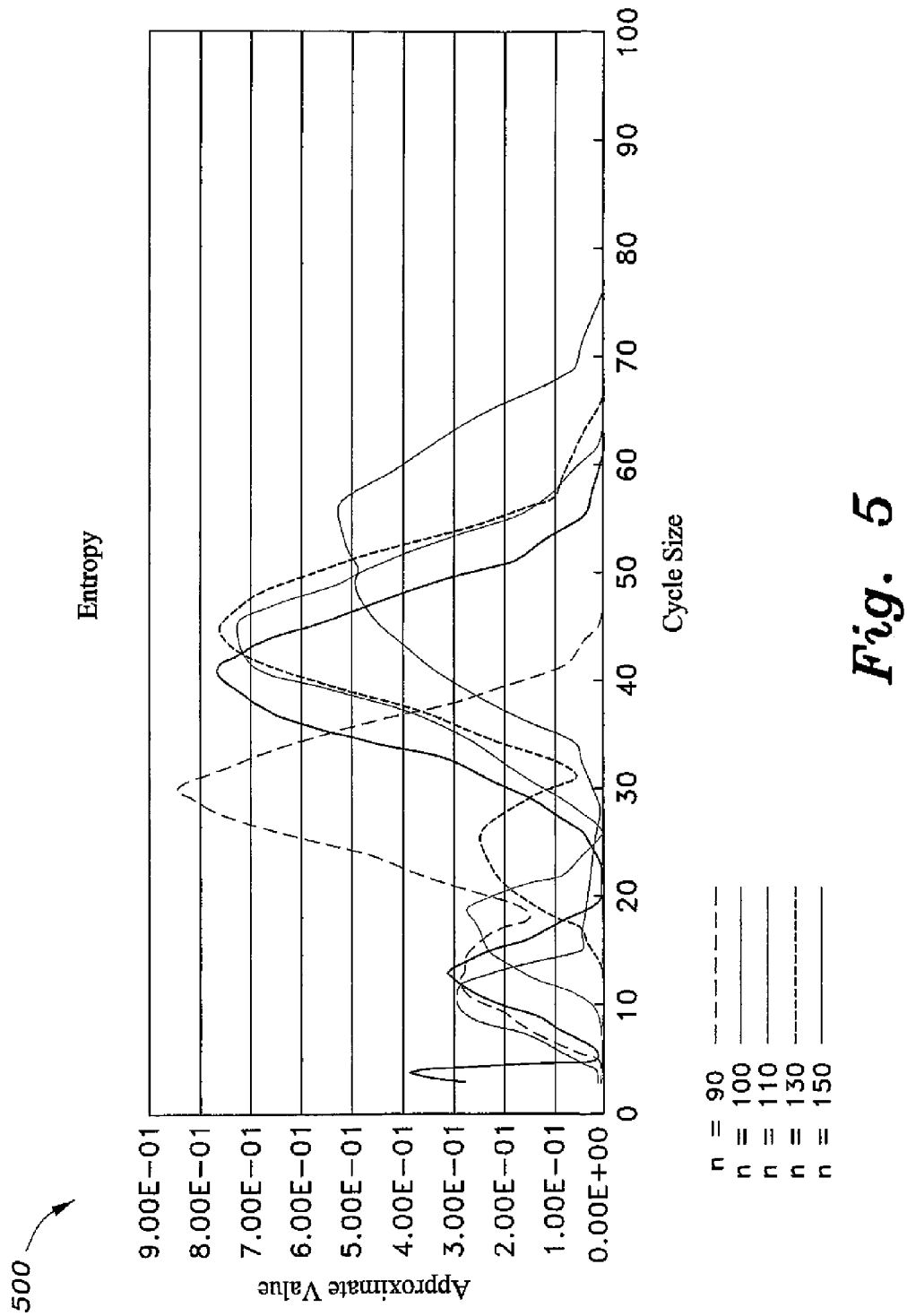
FIG. 5 illustrates an example of cyclic entropy values for the cycle size for the scale-free complex network of FIG. 3B.

Similarly, at step 236 the tool can produce a text file, such as produced in the form of a graph or chart, illustrating the entropy per node, such as the chart 500 of FIG. 5, which illustrates the cyclic entropy values for the scale-free network 300b of FIG. 3B, such as in relation to cycle size. The tool can also select an option as instructed by a software program or instructions, such as a program or instructions stored in a computer readable medium. The different forms of outputs for the feedback capacity described in relation to steps 232, 234, and 236 can include text files, video, charts or graphs, but is not limited in this regard, and additional forms of output can be used. The forms of the output can be produced through a display, in printed form (such as through a printer), a visual display, a digital display, etc. and can be produced digitally, virtually, or through an output device, such as by the output device 150 of FIG. 1. The production of these cyclic counts and cyclic entropy values can be used to indicate the level at which information is no longer significant in the network, i.e, the network feedback capacity.

Figure 6:
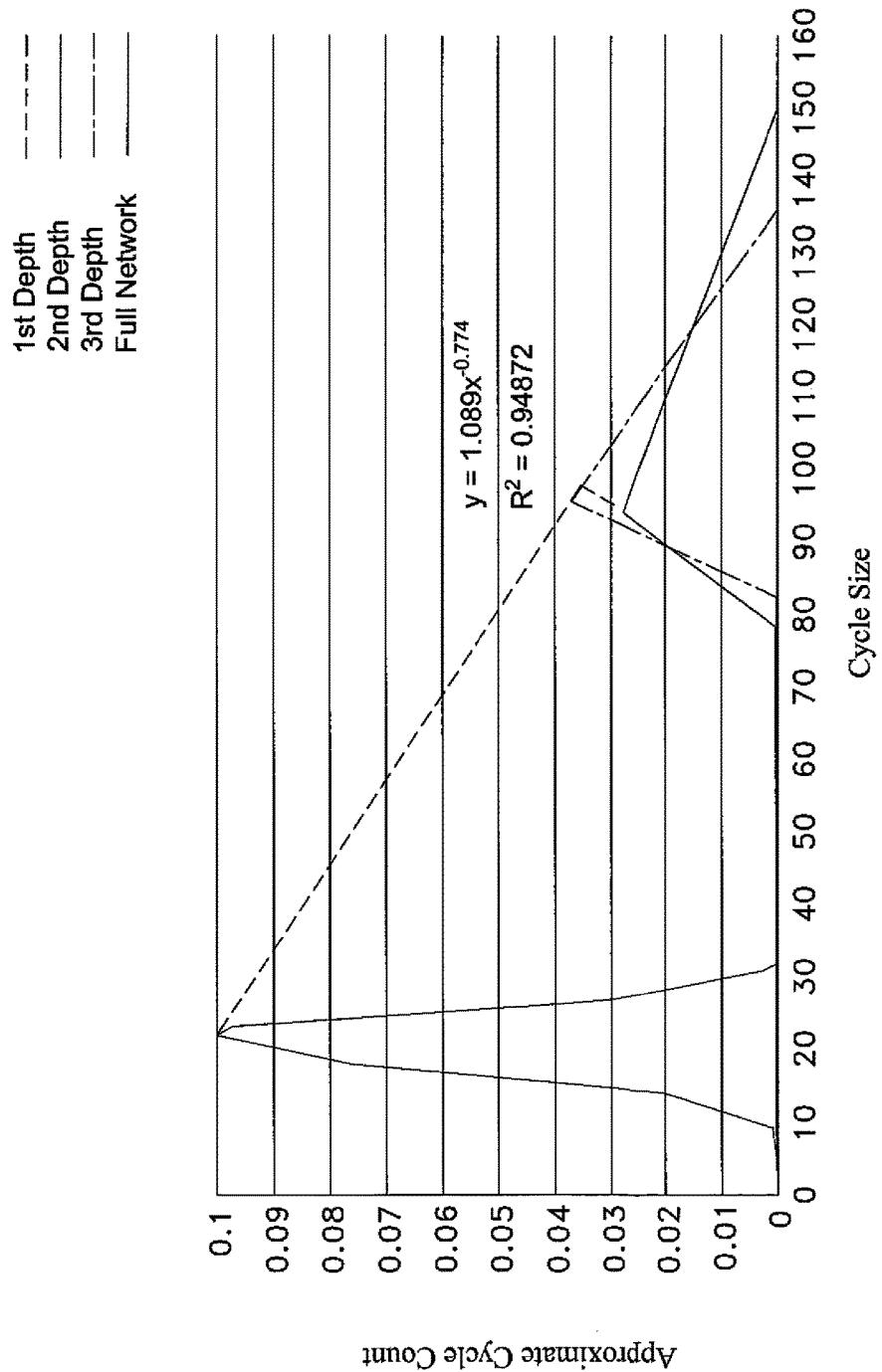
FIG. 6 is a graph illustrating normalized cycle distribution for a random network of 150 nodes and a penetration depth scale of 0.05 for different penetration depths, starting from a randomly selected node with an average degree.
Figure 7:
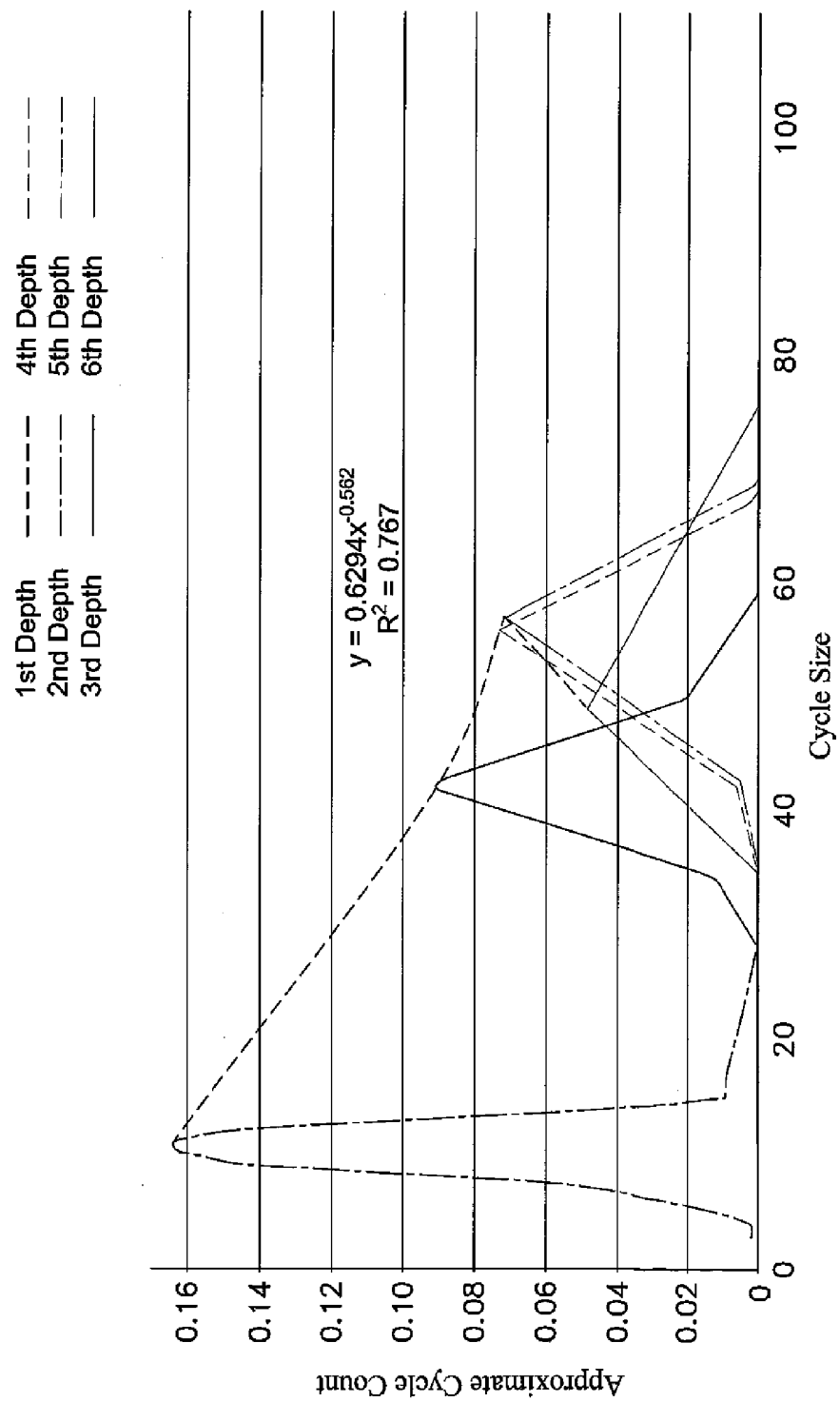
FIG. 7 is a graph illustrating normalized cycle distribution for a scale-free network of 150 nodes, with M=5 and $M_0$=5 at different penetration depths, starting from a randomly selected node with an average degree.

FIG. 6 illustrates normalized cycle distribution for a random network of size N=150 nodes and p=0.05 at different penetration depths, starting from a randomly selected node with an average degree. The dotted trend-line shows the scaling of the most probable cycle size. FIG. 7 illustrates normalized cycle distribution for another scale-free network of size N=150 nodes, M=5 and $M_0$=5 at different penetration depths, starting from a randomly selected node with an average degree. The dotted trend-line shows the scaling of the most probable cycle size. One can see that different samples of complex networks have almost the same cycles' distribution, which means that when the information propagates and diffuses in cycles, the diffusion of those cycles follows the same distribution through the layers of the network, even if one changes the type of network and the starting point. Finding the cycle's distribution helps in predicting the upcoming cycle's distribution for the next penetrations of the network. The most probable cycle sizes $C_m$ at different penetration depths scale as $p \sim C_m^y$ for different network structures and sizes.

Such forms of output are associated with the cycle distribution in a complex network as a whole or in a penetration depth that can determine a relative quality of the network with regard to feedback capacity. The output can be information or data, text, video, graphs, etc and can be transmitted through hard wire, wirelessly, or another form of connection to or by the computing device or system, such as to or by the computing device 100. The methods and systems for determining feedback capacity in complex networks can produce an output in text format, but can also incorporate graphing models for network analysis, for example, and is not limited in this regard. The measurements produced in text, graph, visual display, etc. can be based on cyclic entropy, an uncertainty (heterogeneity) measure of cycle sizes density distribution in the network, that can provide information or data related to the depth penetration and how information or data is diffused in a complex network.

High uncertainties and high cyclic entropy values can be viewed as an analysis that the feedback capacity is large and the network is more self-critical, self-correcting, and capable to accommodate information due the intrinsic property of feedback, i.e., each node is a part of many feedback cycles and can prove or disprove the information received. Diffusion of information from a node to reach out to all (or substantially all) of the rest of the nodes, or to a relatively large number of the nodes, occurs through penetration layers (depths). The information credibility or accuracy can be challenged in each layer due to internal feedback loops.

In embodiments of systems and methods for determining feedback capacity of information distribution, the feedback diffusion capacity and existing patterns of relationships and ties among complex networks entities can be analyzed to determine how the feedback of information is diffused and propagated through the complex network. As the information propagates to subsequent layers in the complex network, on average, the feedback density heterogeneity in the complex network can reach saturation after a penetration level, e.g., a third penetration level of nodes in a complex network, such as in random and scale-free complex networks. The maximum penetration can correspond to the feedback capacity of information distributed in a complex network.

The cyclic entropy values per penetration for random and scale-free networks are shown in FIGS. 8 and 9, respectively, for N=150. The entropy reaches a maximum value in the third and fourth penetrations in most random and scale-free network configurations. Thus, the feedback capacity of the network is reached. The results show that the third penetration depth covers almost 90% of the nodes. In other words, most nodes' feedback is accounted for, and no significant feedback will contribute to the overall network. This explains the reason for the feedback capacity to reach its maximum, as well as the degree of heterogeneity becoming constant. FIG. 10 illustrates the cyclic entropy values versus penetrations for a small-world network of size N=150 for k=4 and different values of p. The networks have different configurations with different starting points. As shown, for the small-world network, the feedback capacity is dynamic and continues to increase as the size of the network increases. FIG. 11 illustrates the cyclic entropy values versus penetrations for different network configurations of size N=150 and a randomly selected node with average degree as a starting point.

The size of the random network affects the penetration depth, depending on the wiring probability. FIG. 12 shows the distribution of the penetrations for different random network sizes. As the network size N is increased, the number of penetrations for the network decreases, even if the starting point was the highest between-ness node, lowest between-ness node, or any randomly selected node with an average degree. Further, the number of penetrations decreases if one increases the connecting (wiring) probability p. Comparing the penetrations distribution for different networks configurations, one can see that the number of penetrations for scale-free networks is less than that for small-world networks, and more than those of random networks, as illustrated in FIG. 13. FIG. 13 shows the number of penetrations for different network configurations for different sizes and a randomly selected node with average degree as the starting point.

Embodiments of the methods and systems for determining feedback capacity of information distribution, can include embodiments of systems connected to a complex network, such as a local area network (LAN), a wide area network (WAN), cellular network, radio network, broadcasting network, intranet, extranet, the Internet, a cloud network, etc., that are capable of exchanging data with and retrieving data therefrom, for example. Devices that can connect to the complex network can take the form of modem, Ethernet cards, Universal Serial Bus (USB) interfaces, serial interfaces, radio transceiver cards, such as for Code Division Multiple Access (CDMA) and/or Global System for Mobile (GSM) communications (which enable the communication to a network) can also be used in methods and systems for determining feedback capacity of information distribution.

Also, as to the memory and memory devices described herein, such as memory and storage associated with computing devices and servers, the memory and memory devices can include various kinds and types of computer readable media, and should not be construed in a limiting sense. Examples of computer readable media can include a magnetic recording apparatus, non-transitory computer readable storage memory, an optical disk, a magneto-optical disk, flash memory, and/or a semiconductor memory (for example, RAM, ROM, etc.). Examples of magnetic recording apparatus that can be used as memory can include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

With regard to the feedback density calculation system in the measurement of network capacity and feedback diffusion, penetrations, and depths for different complex networks, within non-hierarchal networks, an internal loop (cycle) structure exists. Such a microscopic property is typically not widely looked at in social network analysis due to the computational challenges encountered in counting the cycles existing in the graph. Cycles are formed when a set of adjacent nodes are connected together, where each node is linked to an adjacent node with one link and so forth until the reference node is met again. The loop, or preferably the cycle, can act as a communication channel for feedback to enhance the social actor influence and contribution. For example, if information is dispatched from one node that belongs to a cycle, the information dispatched is highly probable to experience modification if nodes are allowed or asked to provide their feedback. In other words, the chance the information will travel back intact is very small. Natural human behavior suggests a tendency to modify (distort) information either due to cognitive limitations or motivations, whether consciously or subconsciously, well intended or malicious. Information modification, if well intended, can take the form of corrections, adding a self-corrective property to the network. It appears trivial that if the number of feedback loops within a network is large, then the chance is higher for information modifications.

In order to determine how significant the feedback will be at different penetrations (depths) in the network away from the source as the information diffuses in the network, the nature of a complex network, based on cycles, must be examined. The diffusion of interest is the feedback density diffusion. A feedback loop of size k, $C_k$ in a network N is a sub-graph of k nodes connected, either indirectly or directly, with zero displacement, forming a circle. In other words, the loop has the following properties: it exists within a network $C_k \in N$; the first and last nodes are the same; and each link is either undirected or leads to the next neighbor directly.

An example of a feedback loop in a social or communication network includes N social members (nodes) that are connected in a circle configuration (cycle), such that if member i dispatches information to the next neighbor and so on, the information communicated will definitely reach i again, giving i the ability to correct the information if it has been distorted and send it back in the loop again. This is true for any information or data dispatched by any other member connected in the cycle. This property is obviously useful and advantageous, thus it is preferable that the network, at all penetration layers, maintains its feedback capability of sending correct information to the edge of the network to be secured. Feedback loops in networks characterize: (i) network integrity, (ii) information credibility, (iii) network controllability, and (iv) noise activity.

The feedback ability in a network is studied in the framework of network topological structure. The existence of an undirected loop in a communication network implies the capability of information feedback. Such feedback can serve to ensure the accuracy of information or data communicated, dispatched, and to an even greater extent, to self-correct the information in case of noise (i.e., false information dispatched by one of the members of the loop). A suggested measure of feedback capability is the cyclic entropy. By counting and enumerating the cycles passing through the source node, the measure of randomness can be calculated as cyclic entropy. Higher entropy suggests more intensified feedback capability in the network or the penetration length. At each penetration length, the cyclic entropy that signifies the feedback density or capacity is calculated and compared to the former penetration. The result of the calculation leads to the feedback density and significance in the network at each penetration level.

It is to be understood that the present invention is not limited to the embodiments described above, but encompasses any and all embodiments within the scope of the following claims.

We claim:

1. A system for determining feedback capacity of information distributed in a complex network, comprising:
at least one computing device having at least one memory associated with the at least one computing device to store instructions and at least one processor associated with the at least one computing device to execute instructions stored in the memory to determine the feedback capacity in the complex network, the processor executing the stored instructions to:
select at least one complex network;
select at least one node as a source node to determine a depth penetration of the complex network;
determine the depth penetration for nodes in the complex network based on the source node;
determine a plurality of cycle counts per node for the complex network;
determine the cyclic entropy per penetration corresponding to the determined cycle counts and the determined depth penetration;
determine the feedback capacity for the selected complex network based on the determined cyclic entropy per penetration, wherein a maximum penetration defines the feedback capacity of the network;
produce an information text file related to the determined cyclic counts per node;
produce an information text file related to the determined cyclic entropy values per penetration;
produce an information text file related to the entropy per node for nodes in the complex network; and
display by an output device information related to the determined feedback capacity for the selected complex network, wherein the information displayed relates to the determined cyclic counts per node, the determined cyclic entropy per penetration, and to an entropy per node for nodes in the complex network.

2. The system for determining feedback capacity according to claim 1, wherein the complex network includes one or more of a cloud-based network, a radio network, a cellular network, a Wide Area Network (WAN), an intranet, an extranet, or the Internet.

3. A method for determining feedback capacity of information distributed in a complex network, comprising the step of executing, with a processor of a computer-implemented device, a program stored in a non-transitory memory of the computer-implemented device, the program including instructions executed by the processor directing the computer-implemented device to perform the following:

select at least one complex network;

select at least one node as a source node to determine a depth penetration of the complex network;

determine the depth penetration for nodes in the complex network based on the source node;

determine a plurality of cycle counts per node for the complex network;

determine the cyclic entropy per penetration corresponding to the determined cycle counts and the determined depth penetration;

determine the feedback capacity for the selected complex network based on the determined cyclic entropy per penetration;

produce an information text file related to the determined cyclic counts per node;

produce an information text file related to the determined cyclic entropy values per penetration;

produce an information text file related to the entropy per node for nodes in the complex network; and display by an output device information related to the determined feedback capacity for the selected complex network, wherein the information displayed relates to the determined cyclic counts per node, the determined cyclic entropy per penetration, and to an entropy per node for nodes in the complex network.

4. The method for determining feedback capacity according to claim 3, wherein the complex network includes one or more of a cloud-based network, a radio network, a cellular network, a Wide Area Network (WAN), an intranet, an extranet, or the Internet.

* * * * *